United States Patent
Sipma et al.

(10) Patent No.: US 7,544,917 B2
(45) Date of Patent: Jun. 9, 2009

(54) SEALING CONSTRUCTION

(75) Inventors: Sijmen Sipma, De Knipe (NL); Wieger van der Meulen, Damwoude (NL); Sebastiaan Jozef Clemens Buijs, Noordhorn (NL)

(73) Assignee: Tetra Laval Holdings & Finance S.A., Pully (CH)

( * ) Notice: Subject to any disclaimer, the term of this patent is extended or adjusted under 35 U.S.C. 154(b) by 757 days.

(21) Appl. No.: 11/192,931

(22) Filed: Jul. 29, 2005

(65) Prior Publication Data

US 2006/0021518 A1    Feb. 2, 2006

(30) Foreign Application Priority Data

Jul. 30, 2004   (NL) .................................. 1026756

(51) Int. Cl.
*H05B 1/02* (2006.01)
(52) U.S. Cl. ................... 219/482; 219/490; 219/494; 99/452; 99/466
(58) Field of Classification Search ............... 219/482, 219/490, 491, 494; 99/455, 452, 466, 460
See application file for complete search history.

(56) References Cited

U.S. PATENT DOCUMENTS

| | | | |
|---|---|---|---|
| 3,038,733 A | | 6/1962 | Hudson et al. |
| 3,599,993 A | * | 8/1971 | Eriksson ..................... 277/563 |
| 3,934,311 A | * | 1/1976 | Thompson ................... 452/13 |
| 4,071,255 A | * | 1/1978 | Salter, Jr. .................... 277/349 |
| 4,136,886 A | | 1/1979 | Sjoholm et al. |
| 4,974,860 A | * | 12/1990 | Anzue et al. ................ 277/424 |
| 4,989,504 A | * | 2/1991 | Jay ............................. 99/455 |
| 6,539,845 B2 | * | 4/2003 | Sipma et al. ................. 99/466 |

FOREIGN PATENT DOCUMENTS

| | | |
|---|---|---|
| DE | 37 00 839 A1 | 7/1988 |
| EP | 0 408 532 A | 1/1991 |
| GB | 1 025 999 A | 4/1966 |

OTHER PUBLICATIONS

International Search Report dated Nov. 11, 2005.

* cited by examiner

*Primary Examiner*—Mark H Paschall
(74) *Attorney, Agent, or Firm*—Quarles & Brady LLP

(57) ABSTRACT

A curd preparation vat provided with a sealing construction for a shaft passing through a wall of the vat, which sealing construction has at least one receiving space and a sealing ring included therein in operation, surrounding the shaft, wherein the sealing ring has an annular body which is provided with a sealing lip which cooperates with a radially extending surface of the sealing construction, and wherein the annular body furthermore has an axially inner surface abutting against first positioning means of the sealing construction, wherein the sealing lip of the at least one sealing ring extends both radially and axially obliquely outwards from a both radially and axially outer edge area of the annular body, and wherein between the sealing lip and the inner surface of the annular body that abuts against the shaft, an axially outer surface of the annular body is situated, which cooperates directly with second positioning means, which leave the lip clear, for fixing the at least one sealing ring between the first and the second positioning means.

12 Claims, 3 Drawing Sheets

SEALING CONSTRUCTION

Figure 1:
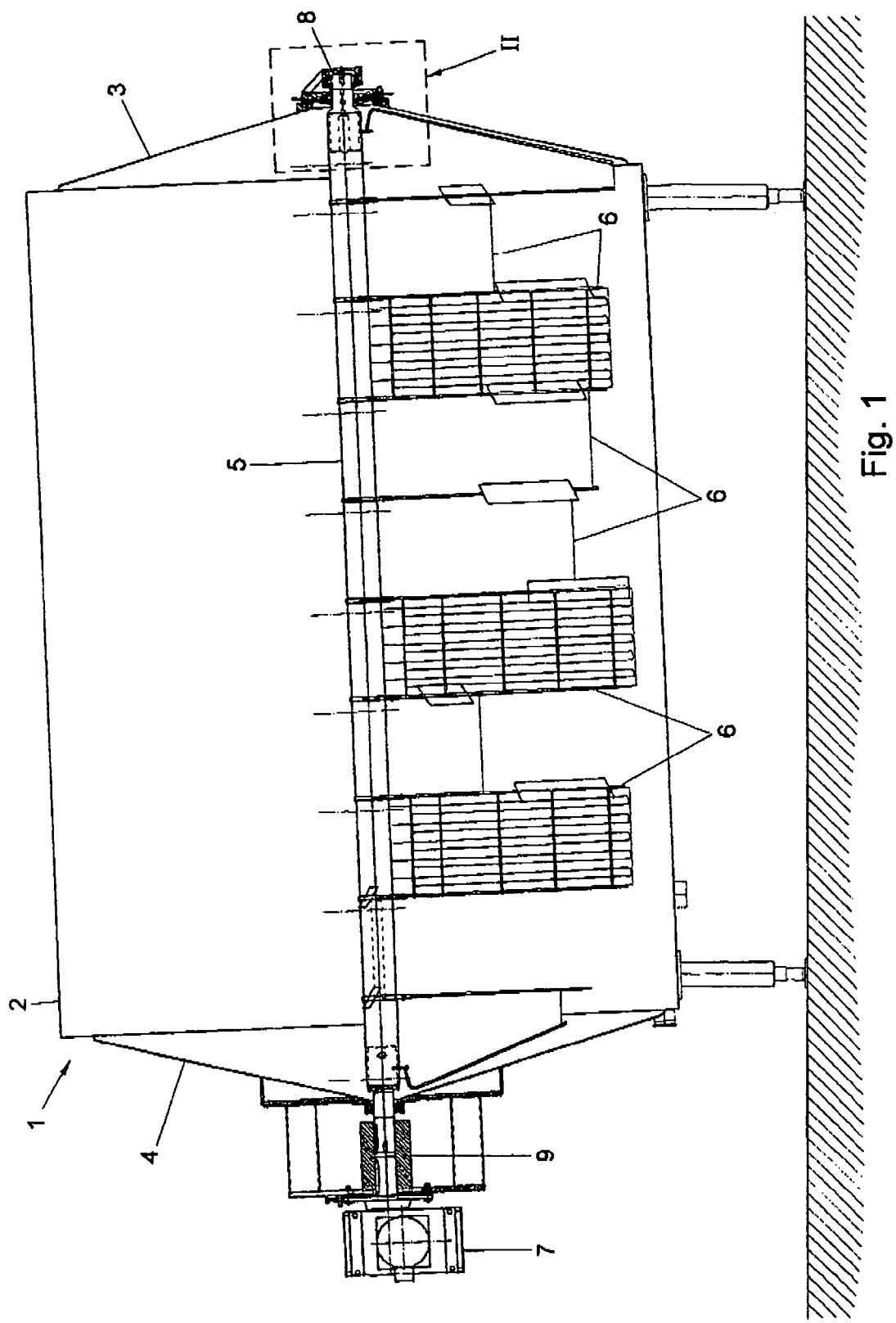

The invention relates to a curd preparation vat comprising a holder with a holder wall and a central shaft which carries cutting and/or stirring members and which, adjacent at least one of the ends, passes through the holder wall, which curd preparation vat is provided with at least one sealing construction for the shaft passing through the holder wall, which sealing construction has at least one receiving space and a sealing ring included therein in operation, surrounding the shaft, wherein the sealing ring has an annular body which is provided with a sealing lip which cooperates with a surface of the sealing construction extending radially relative to the shaft, and wherein the annular body furthermore has an axially inner surface abutting against first positioning means of the sealing construction. Such curd preparation vats, also referred to as curd (preparation) tanks or cheese vats or cheese tanks, are known from practice and are for instance marketed by applicant under the name of Tetra Tebel OST.

U.S. Pat. No. 4,136,886 discloses a sealing device for a shaft passing through a wall of, for instance, a jam preparation vat or a curd preparation vat. The known sealing device comprises an annular chamber formed in a wall part of the holder, enclosing the shaft, which chamber is connected with a supply line for cleaning liquid or with a drain line, depending on the position of a valve. Situated in the annular chamber is an outer sealing ring, surrounding the shaft, of the so-called V-type. Such a ring has an approximately V-shaped groove in a surface remote from the shaft, thereby forming a lip extending obliquely axially outwards from the shaft, which lip has the free edge resting against a wall of the annular chamber. Furthermore, on the surface of the wall part comprising the annular chamber that faces the interior of the holder, an inner, similar sealing ring is arranged, whose lip has the free edge resting against the surface mentioned. Between the annular chamber and the interior of the holder, flush channels for cleaning fluid are provided. The flush channels terminate under the lip of the inner sealing ring, so that it can be pushed away from the wall surface by the pressure of the cleaning liquid to enable a best possible flush of the cleaning liquid. During normal use of the holder, the outer sealing ring provides for sealing of the annular chamber in axial direction from the annular chamber to the outside, that is, in a direction away from the interior of the holder. The inner sealing ring serves to prevent flow of liquid from the holder into the annular chamber. If leakage occurs nonetheless, the liquid collected in the annular chamber can be drained via the drain line.

A drawback of the known sealing system is that especially with relatively large holders having a long shaft, for instance curd preparation vats having a content of 20,000 liters and more, still relatively much leakage occurs, which is undesirable. The cause of this phenomenon is attributed to both the relatively great radial play of the shaft due to manufacturing tolerances and bending of the shaft, and the relatively great axial play of the shaft owing to expansion differences between the relatively massive shaft and the holder in case of temperature variations. The lip of the sealing rings is thereby loaded to such an extent that the sealing action decreases.

The object of the invention is to obviate, at least reduce, the drawbacks outlined. To this end, according to the invention, a curd preparation vat of the above-mentioned type is characterized in that the sealing lip of the sealing ring extends both radially and axially obliquely outwards from a both radially and axially outer edge area of the annular body, and that between the sealing lip and the inner surface of the annular body abutting against the shaft, there is an axially outer surface of the annular body which cooperates directly with second positioning means, which leave the lip clear, for fixing the sealing ring between the first and the second positioning means.

In the following, the invention will be further described with reference to the accompanying drawing of an exemplary embodiment.

Figure 2:
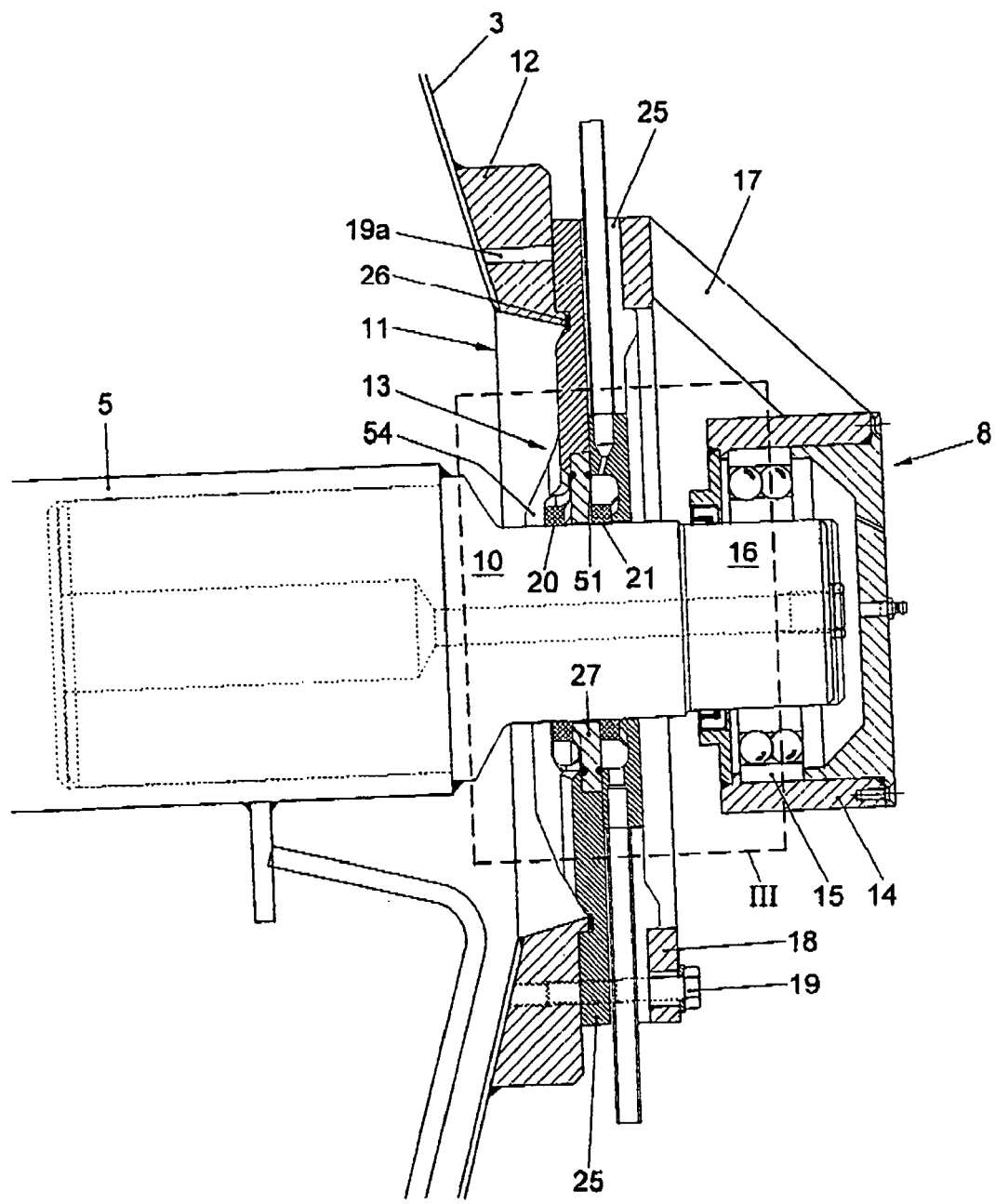
Figure 4:
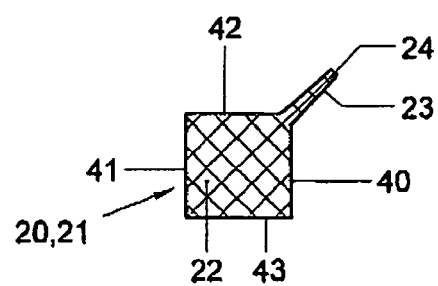
Figure 3:
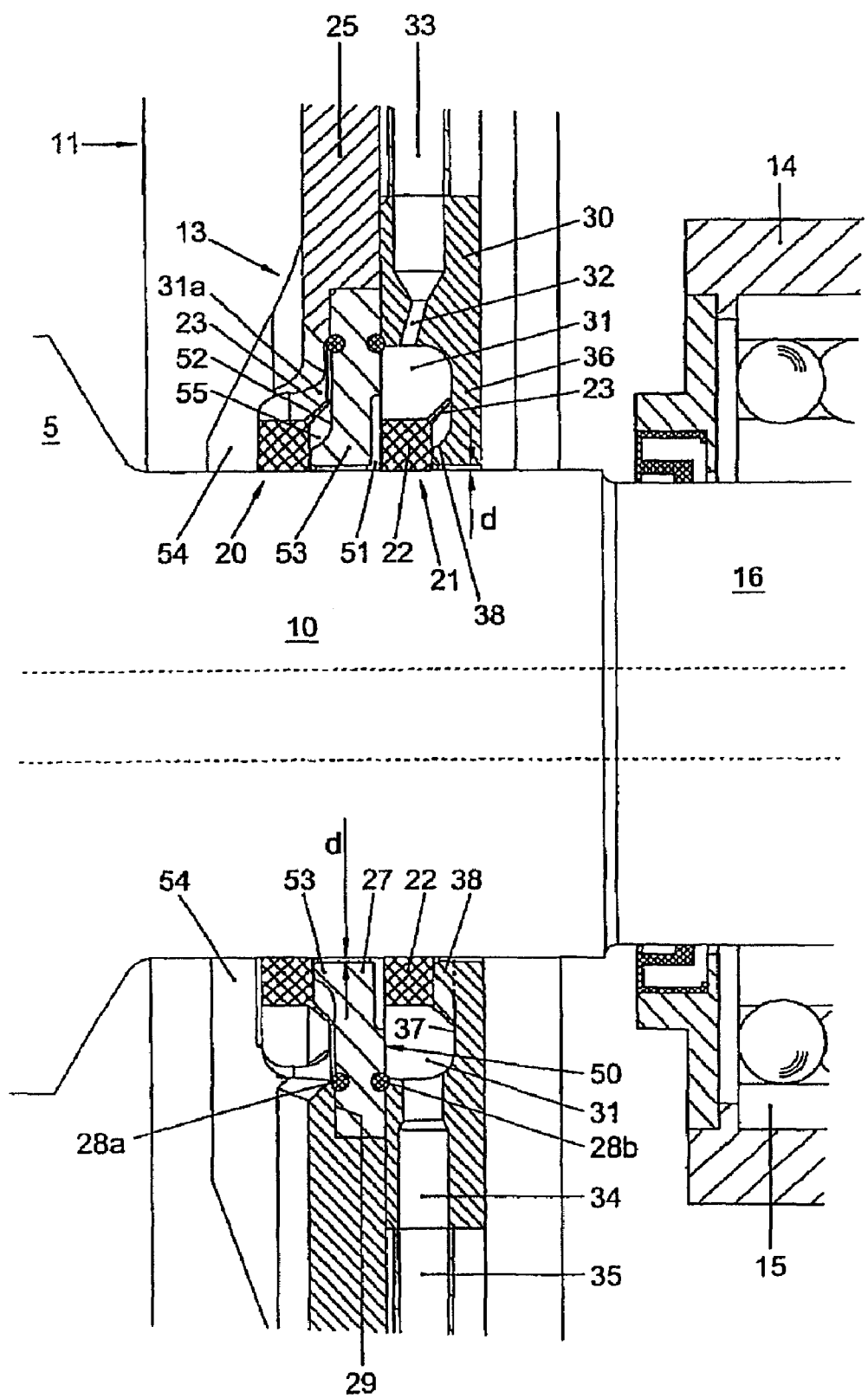

FIG. 1 schematically shows in vertical longitudinal section an example of a curd preparation tank in which the invention can be used;

FIG. 2 schematically shows in cross section the portion of FIG. 1 indicated in FIG. 1 by II on a large scale, with a sealing construction according to the invention;

FIG. 3 schematically shows on a still larger scale the portion III of FIG. 2; and FIG. 4 schematically shows in cross section an example of a sealing ring for a sealing construction according to the invention.

FIG. 1 schematically shows, largely in vertical longitudinal section, an example of a holder 1 in which the invention can be used. In this example, the holder is a curd preparation vat, also called cheese vat or curd tank. The curd tank comprises a substantially horizontal cylindrical tank 2 with end shields 3 and 4. Extending within the tank in the longitudinal direction is a central shaft 5 which carries curd cutting and stirring members 6 and which is operatively driven for rotation by a driving motor 7. Such tanks, as also shown in the drawing, are typically set up at a slight inclination to simplify emptying of the tank.

The central shaft is bearing-mounted outside the tank 2 in a bearing construction 8 on the non-driven side, and on the driven side is connected through a coupling construction 9 with the driving motor 7, which at the same time functions as bearing. In case of a large tank, which can have a content of, for instance, 20,000 liters or more, the central shaft 5 has a considerable length, which can be, for instance, in the order of 5 m. The central shaft is usually largely solid, that is, designed as a very thick-walled tube. The diameter of the shaft can be in the order of, for instance, 10 to 12 cm. Such a shaft bends to some extent under its own weight and as a result of the load occurring during operation, which must be taken up adjacent the bearing constructions through a possibility of allowing play. At the same time, however, the sealing action of the sealing construction should be preserved.

Furthermore, upon a temperature increase, the holder itself, typically having a wall thickness in the order of a few millimeters, for instance 3 mm, expands faster than the central shaft. As a result, for instance during cleaning procedures, involving flushing with heated cleaning liquid, the sealing construction on the side of the outer bearing 8 can shift relative to the central shaft in case of a large tank over a relatively large distance, which can for instance be in the order of 5 mm. This effect should also influence the sealing action to the least possible extent.

FIG. 2 shows the portion II of FIG. 1 on a larger scale. The central shaft 5 passes from the interior of the tank by way of a reduced journal 10 through a wide opening 11 in the end shield 3 of the tank 2, and through a sealing construction 13, mounted on the end shield 8 via a supporting ring 12, to outside the tank. Furthermore, beyond the sealing construction 13, an external bearing construction 8 is mounted, remote from the sealing construction, on the supporting ring 12. The bearing construction 8 comprises a bearing house 14 which, in this example, includes a ball bearing 15 which, in this example, receives the slightly further reduced end part 16 of the journal 10. The bearing house 14 is connected through a number of radially distributed arms 17, one of which is visible, to a mounting ring 18, which in turn is attached to the supporting ring 12 with bolts 19.

It is noted that FIGS. 2 and 3 show the sealing construction at the non-driven end of the central shaft. However, a sealing construction according to the invention can also be used at the other end of the shaft.

The example of a sealing construction according to the invention shown in FIG. 2 is shown schematically on a slightly larger scale in FIG. 3. In FIGS. 2 and 3 it can be seen that the sealing construction in the example shown comprises, viewed in axial direction and with respect to the interior of the tank, an inner sealing ring 20 and a similarly shaped outer sealing ring 21, both fitted on the journal 10.

The sealing rings are made of suitable elastic material and in this example have an annular body 22 of a substantially rectangular cross section and having an axially outer surface 40, an axially inner surface 41, a radially outer surface 42 and a radially inner surface 48. See also FIG. 4, which schematically shows a cross section of an example of a sealing ring according to the invention on a still slightly larger scale. The annular body 22 forms directly a sealing with respect to the journal 10. Furthermore, the annular body is provided with a sealing lip 23, which extends obliquely upwards and in mounted condition outwards from the annular body, more specifically, from a both radially and axially outer edge of the annular body. In the example shown, the sealing lip 23 extends in line with a diagonal of the annular body, that is, from the transition area between the surfaces 40 and 42 in FIG. 4. The sealing lips 23 of sealing rings 20, 21 form a sealing edge 24, which operatively forms a sealing relative to a radial surface of the sealing construction.

Examples of suitable materials for the sealing rings are rubber or rubbery materials, such as for instance food-approved FPM polymers, Or EPDM and like materials.

The sealing construction furthermore comprises a disc-shaped house 25, which is provided with positioning means to fix the sealing rings. The disc-shaped house is mounted on the supporting ring 12 with bolts 19a or the like, with interposition of sealing means such as an O-ring 26.

In this example, the disc-shaped house 25 is provided with a central disc-shaped recess, in which a ring 27 is mounted. The ring 27 abuts by its surface facing the interior of the tank, with interposition of a first O-ring 28a, against a radial flange 29 of the disc-shaped house 25. The ring 27 further abuts by its axially outwardly facing surface, with interposition of a second O-ring 28b, against an annular member 30, which forms a central chamber 31 around the journal 10. The central chamber 31 is connected via at least one bore 32 in the annular member 30 with at least one supply line 33 for cleaning liquid. The central chamber 31 is furthermore connected via at least one other bore 84 with at least one drain line 35 for leakage fluid and cleaning liquid. It is also possible, however, to use one or more combined supply/drain lines.

In the chamber 31, furthermore, the outer sealing ring 21 is situated. The lip 23 of the outer sealing ring 21, extending obliquely outwards from the radially and axially outer edge of the annular body, has its sealing edge 24 abutting against a radial inner surface 37 of an outer wall 36 of the chamber 31.

Furthermore, adjacent the journal 10, the outer wall 86 of the chamber 31 is provided with cams 38 extending axially inwards under the sealing lip 23 of the outer sealing ring 21, which cams 38 abut against the axially outer surface 40 of the annular body 22 of the sealing ring 21. Instead of the cams 38, also an annular shoulder with cross grooves or the like could be used.

The outer sealing ring 21 furthermore abuts by its axially inner surface 41 against the axially outer surface 50 of the ring 27. The ring 27, further, is provided, in its axially outer surface 50 adjacent the sealing ring 21, with radially distributed recesses 51, which form a passage for cleaning liquid. The ring 27, similarly to the chamber wall 86, is provided, on the axially inner surface 52, that is, the surface facing the interior of the tank, with cams 53 or the like which, under the sealing lip 23 of the inner sealing ring, abut against the axially outer surface 40 of the inner sealing ring 20. The sealing lip 23 of the inner sealing ring 20 then abuts by its sealing edge 24 against the surface 52 of the ring 27.

The axially inner surface 41 of the inner sealing ring 20 abuts against radially distributed fingers 54 of the disc-shaped house 25.

As a result of the construction described, the annular bodies of the sealing rings 20 and 21 are directly fixed relative to the end shield 3 of the tank. If the journal 10 and the tank wall move relative to each other in axial direction, the sealing rings remain in the same position relative to the tank wall, and the radially inner surfaces 43 of the sealing rings slide over the journal without the sealing lips 23 thereby being loaded or changing their orientation. The sealing action of the sealing lips 23 is therefore not influenced.

The fingers 54, the ring 27 and the annular member 30 surround the journal 10 with some clearance "d", thereby allowing a slight radial movement of the journal 10 relative to the sealing construction. Upon such a movement, the sealing edges 24 of the sealing lips slide to some extent over the radial surfaces 37 and 52 of the chamber wall 36 and the ring 27, while the original orientation of the sealing lips is substantially preserved and the sealing action remains guaranteed.

If in the chamber 31 and/or in the interior of the tank an increased liquid pressure occurs, the sealing lips 23 of the sealing rings are pushed more firmly against the surfaces 37 and 52, respectively, so that the sealing action can increase further.

During a cleaning cycle, with the drain line 35 closed, cleaning liquid is supplied under pressure via the supply line 88 for cleaning liquid and the bore 32 to the chamber 31. This cleaning liquid cannot pass the lip 23 of the outer sealing ring 21, but via the recesses 51 in the ring 27 and via the space between the ring 27 and the journal 10 and via the intermediate space between the cams 53, can reach the space 65 under the sealing lip 23 of the inner sealing ring. The lip 23 can bend upwards under the influence of the pressure exerted by the cleaning liquid, allowing the cleaning liquid to pass, whereby the space under the lip is cleaned.

It is noted that after the foregoing, various constructional modifications will readily occur to those skilled in the art. Thus, if desired, the sealing construction described can be designed with a sealing ring according to the invention in one receiving space and a different type of sealing ring in the other receiving space. Also, if desired, the sealing construction can be designed with just a single receiving space for a sealing ring. In that case, in the example shown, for instance the outer receiving space situated between the ring 27 and the chamber wall 36, and the sealing ring 21 could be omitted. The ring 27 could then be attached by means of bolts or the like to the disc-shaped house 25. The sealing would then be provided by the sealing ring 20 situated in the receiving space 31a formed between the axially inner surface of the ring 27 and the fingers 54. Such a singular seal could for instance be used in a curd tank for making flat cheese, or in a curd distribution tank for block formers or in a mixing tank for curd and cream. Furthermore, if desired, it would be possible to design the sealing construction with more than two axially consecutive receiving spaces for sealing rings, with a sealing ring according to the invention being used in at least one receiving space.

These and similar modifications are understood to fall within the framework of the invention.

The invention claimed is:

1. A curd preparation vat comprising a holder with a holder wall and a central shaft which carries cutting and/or stirring members and which, adjacent at least one of the ends, passes through the holder wall, which curd preparation vat is provided with at least one sealing construction for the shaft passing through the holder wall, which sealing construction has at least one receiving space and a sealing ring included therein in operation, surrounding the shaft, wherein the sealing ring has an annular body which is provided with a sealing lip which cooperates with a surface of the sealing construction extending radially relative to the shaft, and wherein the annular body furthermore has an axially inner surface abutting against first positioning means of the sealing construction, which first positioning means are stationary relative to the holder wall, wherein the sealing lip of the sealing ring extends both radially and axially obliquely outwards from both a radially and axially outer edge area of the annular body, and in that between the sealing lip and the inner surface of the annular body that abuts against the shaft, an axially outer surface of the annular body is situated, which cooperates directly with second positioning means, which second positioning means are stationary relative to the holder wall and which leave the lip clear, for fixing the sealing ring between the first and second positioning means.

2. A curd preparation vat according to claim 1, wherein the second positioning means comprise cams, which adjacent the shaft, extend from the surface extending radially relative to the shaft to the axially outer surface of the annular body.

3. A curd preparation vat according to claim 1, wherein the first positioning means comprise a number of radial arms, which extend from positions spaced from the shaft in a radial direction to a point near the shaft.

4. A curd preparation vat according to claim 1, wherein the sealing construction has an axially inner and outer receiving space, and, operatively included therein, a respective inner and outer sealing ring surrounding the shaft, and wherein at least the inner sealing ring has a sealing lip, wherein a disc-shaped house which is operatively attached to the holder wall and is provided with a central passage for the shaft, and with a central chamber, in which a ring surrounding the shaft is placed, having an axially outer surface and an axially inner surface, wherein the axially outer surface of the ring abuts against the axially inner surface of the outer sealing ring, and wherein the second positioning means comprise radially distributed cams provided on the axially inner surface of the ring, which cams abut against the axially outer surface of the inner sealing ring, while the sealing lip of the inner sealing ring, at a position situated radially beyond the cams, abuts against the axially inner surface of the ring.

5. A curd preparation vat according to claim 4, wherein the first positioning means comprise radially distributed fingers arranged on the disc-shaped house, situated axially inwards with respect to the ring, extending towards the shaft, which fingers abut against the axially inner surface of the inner sealing ring and together with the cams of the ring fix the inner sealing ring.

6. A curd preparation vat according to claim 4, wherein the outer sealing ring has a sealing lip, wherein the sealing lip of the outer sealing ring, spaced from the shaft, rests against the inner surface of the radial outer wall, closing the central chamber, of an annular member enclosing the shaft, which inner surface, furthermore, is provided, adjacent the shaft, with axially inwardly extending positioning means, which form part of the second positioning means for the outer sealing ring and which, between the lip and the shaft, abut against the axially outer surface of the annular body of the outer sealing ring, and which together with the axially outer surface of the ring placed in the central chamber, fix the outer sealing ring.

7. A curd preparation vat according to claim 6, wherein the inwardly extending positioning means provided on the inner surface of the radial outer wall comprise cams.

8. A curd preparation vat according to claim 4, wherein the ring placed in the central chamber surrounds the shaft with some space and that the ring is provided with recesses in the axially outer surface adjacent the outer sealing ring, which recesses, together with the space between the ring and the shaft, form a liquid passage which connects the central chamber with the space between the shaft and the sealing lip of the inner sealing ring.

9. A curd preparation vat according to claim 4, wherein the central chamber is connected with at least one drain line and at least one supply line for cleaning liquid.

10. A curd preparation vat according to claim 4, wherein on the outside of the disc-shaped house, a number of arms are attached which carry a bearing construction for the central shaft, situated at an axial distance from the sealing construction.

11. A curd preparation vat according claim 1, wherein the curd preparation vat is an elongate vat which is arranged to be set up in a horizontal position.

12. A curd preparation vat according claim 1, provided with a shaft having a length of about at least 3 meters.

* * * * *

UNITED STATES PATENT AND TRADEMARK OFFICE
CERTIFICATE OF CORRECTION

PATENT NO. : 7,544,917 B2  Page 1 of 1
APPLICATION NO. : 11/192931
DATED : June 9, 2009
INVENTOR(S) : Sipmai et al.

It is certified that error appears in the above-identified patent and that said Letters Patent is hereby corrected as shown below:

Column 4, line 38 "88" should be changed to -- 33 --

Column 4, line 59 "31aformed" should be changed to -- 31a formed --

Signed and Sealed this

First Day of September, 2009

David J. Kappos
*Director of the United States Patent and Trademark Office*